US008306529B2

(12) United States Patent
Sharma

(10) Patent No.: US 8,306,529 B2
(45) Date of Patent: Nov. 6, 2012

(54) METHOD AND APPARATUS FOR CONCURRENT REGISTRATION OF VOICE AND DATA SUBSCRIBERS

(75) Inventor: Alok Sharma, Lisle, IL (US)

(73) Assignee: Alcatel Lucent, Paris (FR)

( * ) Notice: Subject to any disclaimer, the term of this patent is extended or adjusted under 35 U.S.C. 154(b) by 284 days.

(21) Appl. No.: 11/521,645

(22) Filed: Sep. 15, 2006

(65) Prior Publication Data

US 2008/0070555 A1 Mar. 20, 2008

(51) Int. Cl.
*H04Q 7/20* (2006.01)
(52) U.S. Cl. ............... 455/433; 455/414.1; 455/435.1; 455/426.1; 455/435.2; 455/435.3; 370/349; 370/328; 370/338; 370/352; 370/431; 370/503; 713/202
(58) Field of Classification Search ............... 455/414.1, 455/433, 78, 435.1, 426.1, 556.1, 411, 410, 455/13.2; 370/349, 328, 338, 352, 431, 503; 713/202
See application file for complete search history.

(56) References Cited

U.S. PATENT DOCUMENTS

| | | | | |
|---|---|---|---|---|
| 6,018,657 A | * | 1/2000 | Kennedy et al. | 455/426.1 |
| 2003/0099213 A1 | * | 5/2003 | Lee et al. | 370/328 |
| 2003/0208601 A1 | * | 11/2003 | Campbell et al. | 709/227 |
| 2004/0106393 A1 | | 6/2004 | Chowdhury et al. | |
| 2004/0162998 A1 | * | 8/2004 | Tuomi et al. | 713/202 |
| 2004/0209615 A1 | * | 10/2004 | Lamb et al. | 455/433 |
| 2005/0232228 A1 | * | 10/2005 | Dharanikota et al. | 370/351 |
| 2006/0013191 A1 | | 1/2006 | Kavanagh | |
| 2006/0079228 A1 | * | 4/2006 | Marsico et al. | 455/433 |
| 2007/0118616 A1 | * | 5/2007 | Simongini et al. | 709/219 |

FOREIGN PATENT DOCUMENTS

| | | |
|---|---|---|
| EP | 1 657 943 A1 | 5/2006 |
| GB | 2 417 856 A | 3/2006 |
| JP | 2004-320726 | 11/2004 |

OTHER PUBLICATIONS

PCT International Search Report, Apr. 10, 2008.
3G High-Speed Data for Enterprise, Customer Testimonial, Lucent Technologies Copyright 2004.

* cited by examiner

*Primary Examiner* — Patrick Edouard
*Assistant Examiner* — Fred Casca
(74) *Attorney, Agent, or Firm* — Fay Sharpe LLP

(57) ABSTRACT

This invention provides an innovative way of providing voice and data registration of multimode (voice and data) handset subscribers at a common place. The unified subscriber data server provides a flexible mechanism to provide concurrent registration for voice and data on the same platform, to store the subscription data (for voice and data subscribers) at a common place, and to perform call-processing on the same box where the data is stored.

13 Claims, 13 Drawing Sheets

METHOD AND APPARATUS FOR CONCURRENT REGISTRATION OF VOICE AND DATA SUBSCRIBERS

BACKGROUND OF THE INVENTION

This invention relates to a method and apparatus for concurrent registration of multimode (voice and data) subscribers in telecommunications networks.

While the invention is particularly directed to the art of telecommunications, and will be thus described with specific reference thereto, it will be appreciated that the invention may have usefulness in other fields and applications.

By way of background, in 2000, the International Telecommunications Union (ITU) released the technical specifications for third generation (3G) International Mobile Telecommunications (IMT) technology under the brand IMT-2000, commonly referred to simply as 3G. 3G has a number of benefits over second generation (2G) technology, including increased transmission rates (e.g., a minimum speed of 2 Mbit/s for stationary users and 348 kbit/s in a moving vehicle versus 2G speeds ranging from 9.6 kbit/s to 28.8 kbit/s), support for the three predominant access technologies (Frequency Division Multiple Access (FDMA), Time Division Multiple Access (TDMA) and Code Division Multiple Access (CDMA)), and support for a wide range of value-added services such as wireless Internet access, wireless Virtual Private Networks (VPNs), personalized content delivery (news, stock quotes, etc.), entertainment, and video conferencing.

The recently developed High-Speed Data for Enterprises (HSDe) has caused cellular service providers around the world to evaluate different broadband access technology choices, including high-speed downlink packet access (HSDPA), CDMA, 1×EV-DO (1×Evolution—Data Only), WiFi/WiMax, Cable and DSL and the like. HSDe is a complete end-to-end solution that removes any barriers to adoption of 3G HSD in the minds of the end user and the Mobile Operator.

The fastest mobile wireless data networks in the world today are generally thought to be the CDMA and UMTS networks. The WiFi/WiMax networks are also high speed data networks, but they have yet to provide the necessary mobility for data subscribers. Persuaded by the winning combination of high revenue services and low network costs, these high speed data networks are being deployed all around the world. As data applications become compelling and data speeds increase, data usage per subscriber has increased dramatically.

Initial capital expenditures can be reduced by deploying data networks (e.g., 1×EV-DO) selectively, since some of the data networks (e.g., 1×EV-DO) handsets support circuit voice networks (e.g., 1×RTT). As a handset roams outside an area covered by the data network (e.g. 1×EV-DO), it can seamlessly handoff to circuit voice and data network (e.g., 1×RTT network), without losing connectivity. While consumers are signing up for the data services wherever they are available, the service providers are faced with a challenge of providing a common place for the registration of the voice and data subscribers in their networks.

Operators have been challenged to respond quickly to demand for broadband access. While the demand for data services grows, such service is still not fast enough for most data users. If it becomes more widely adopted, it will impact the voice capacity of the existing networks that leads to the deployment of the high speed data networks.

Currently, a multimode handset (e.g., providing both voice and high speed data) registers separately into the voice and data wireless networks. With the current network design, however, a wireless service provider needs to maintain the HLR (Home Location Register) and AAA (Authentication, Authorization and Accounting) servers on separate platforms as different network elements and provision the database separately for the same multimode handset. Furthermore, the protocol interworking between voice and data, user-mobility benefits, zero down time upgrade, load-balancing, etc. cannot be achieved. Additionally the operational costs are very high when using separate HLR and AAA servers in the operator's network.

The present invention contemplates a new and improved method and apparatus that resolves the above-referenced difficulties and others. In particular, this invention provides an innovative way of providing voice and data registration of multimode (voice and data) handset subscribers at a common place.

SUMMARY OF THE INVENTION

A method and apparatus for concurrent registration of multimode subscribers (e.g., voice and high speed data) in telecommunication networks are provided.

In one aspect of the present invention, a multimode mobile station registration method is provided. The method comprises receiving an authentication, authorization, and accounting (AAA) query from an external server at a RADIUS server process on a unified subscriber data server control function platform; forwarding the AAA query to a AAA control function application on the control function platform; requesting data relating to the AAA query from a data function application on a unified subscriber data server data function platform; receiving data relating to the AAA query from the data function application; returning a response to the AAA query to the RADIUS server process; and forwarding the response to the AAA query to the external server.

The method may further comprise receiving a mobile application part (MAP) request from a serving mobile switching center/visiting location register (MSC/VLR) at the control function platform; forwarding the MAP request to a home location register (HLR) control function application on the control function platform; requesting data relating to the MAP request from the data function application on the data function platform; receiving data relating to the MAP request from the data function application; and returning a response to the MAP request to the serving MSC/VLR.

In another aspect of the present invention, an apparatus for registration of a multimode mobile station is provided. The apparatus comprises a unified subscriber data server control function platform including a RADIUS server process, a RADIUS server platform monitor process, and a RADIUS control function application; and a unified subscriber data server data function platform including a data function application and a database. The unified subscriber data server control function platform may further include a home location register control function application and/or a RADIUS server management tool.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
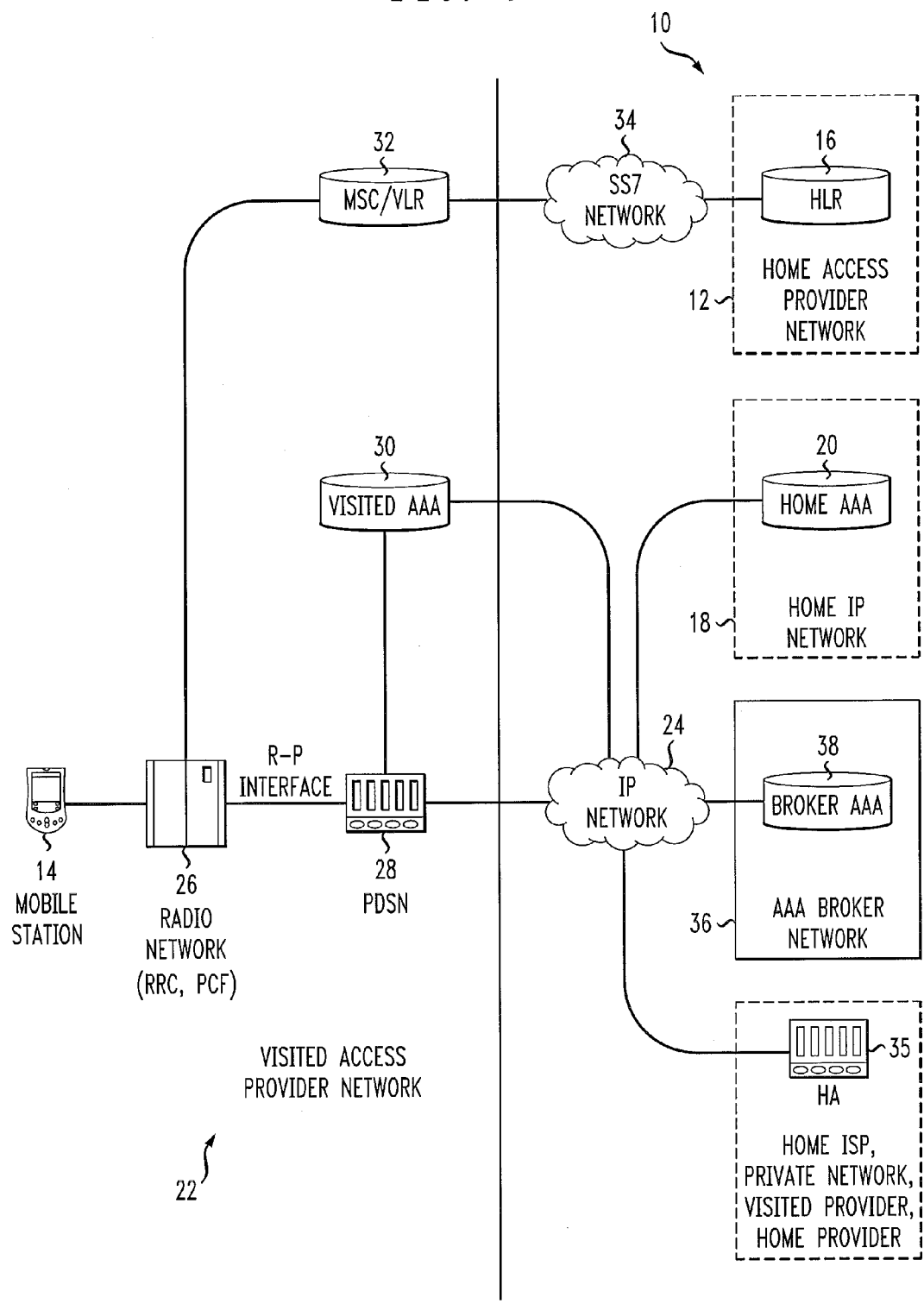
FIG. 1 is a high level block diagram of a standard IMT-2000 data communication network.

Some portions of the detailed description that follows are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Referring now to the drawings wherein the showings are for purposes of illustrating the exemplary embodiments only and not for purposes of limiting the claimed subject matter, FIG. 1 shows a well known 3G data communication network 10.

In the depicted embodiment, the data communication network 10 includes a home access provider network 12 supporting over-the-air (i.e., wireless) voice communication with multimode mobile stations, such as the multimode mobile station 14. The multimode mobile station 14 is capable of using any number of wireless systems (e.g., CDMA, EVDOm, WiFi/WiMax, GSM, UMTS, etc.) or frequency bands (e.g., 800-MHz band, a 1.7-GHz band, a 2-GHz band, etc.). The home access provider network 12 also includes a home location register (HLR) 16.

The data communication network 10 further includes a home IP network 18 supporting data communication and having a home AAA (Authentication, Authorization and Accounting) server 20 with an associated database. As its name implies, the home AAA server 20 is a server program that handles user requests for access to computer resources and, for an enterprise, provides authentication, authorization, and accounting (or AAA) services. The home AAA server 20 authenticates subscribers attempting to gain access to packet data service by comparing the subscriber's credentials (e.g., one or more of a Network Access Identifier (NAI), handset serial number, username, and password) with those within a corresponding entry within the associated database. The home AAA server 20 also records subscribers' network access activity within the database for billing purposes. In one embodiment, the home AAA server 20 implements the Remote Authentication Dial-In User Service (RADIUS) protocol for AAA communication described in Internet Engineering Task Force (IETF) Request for Comment (RFC) 2865 and 2866. These RFCs are hereby incorporated by reference in their entireties.

As further illustrated in FIG. 1, the data communication network 10 may include not only the home access provider network 12, but may further include one or more visited (or foreign) access provider networks 22 coupled to the home access provider network 12 by an IP network 24. The visited access provider network 22 may include one or more radio networks 26 (only one of which is illustrated) coupled to one or more Packet Data-Serving Nodes (PDSNs) 28 via an R-P (Radio-Port) Interface. Each PDSN 28 is a network access server through which mobile stations connect to a packet data network, such as the Internet Protocol (IP) network 24 (e.g., the Internet or Local Area Network (LAN)). The visited access provider network 22 includes a visited AAA server 30 and a Mobile Switching Center/Visitor Location Register (MSC/VLR) 32, which is a switch (MSC) and a database (VLR) that serves the mobile station 14 in its current location for circuit switched. (CS) services. The VLR can service multiple MSCs or, alternatively, may be co-located with a given MSC as illustrated in FIG. 1. The MSC/VLR 32 communicates with the HLR 16 of the home access provider network via an SS7 network 34.

The data communication network 10 further includes a Home Agent (HA) 35. The HA 35 is a node on the home network that effectively causes the mobile station (or node) 14 to be reachable at its home address even when the mobile station 14 is not attached to its home network. The data communication network 10 also includes an AAA broker network 36 having a broker AM server 38.

Typically, the mobile station 14 is registered with the HLR 16 of the home access provider network 12 for voice and with the AAA server 20 of the home IP network 18 for high speed data.

In the voice network 12, the HLR 16 is responsible for getting the registration requests from the MSC/VLR 32, authenticating the user, and then returning the profile information of the subscriber. More particularly, the HLR 16 is the main database of permanent subscriber information for a mobile network. The HLR 16 is an integral component of CDMA (code division multiple access), TDMA (time division multiple access), and GSM (Global System for Mobile communications) networks. Maintained by the subscriber's home carrier (or the network operator where the user initiated the call), the HLR 16 contains pertinent user information, including address, account status, and preferences. The HLR 16 interacts with the MSC/VLR 32, which is used for call control and processing. The MSC/VLR 32 also serves as a point-of-access to the Public Switched Telephone Network (PSTN—the fixed network). The MSC/VLR 32 maintains temporary user information (such as current location) to manage requests from subscribers who are out of the area covered by their home system.

When a user initiates a call, the switching equipment determines whether or not the call is coming from the device's home area. If the user is out of the home area, the visited MSC/VLR 32 sends out a request for information required to process the call. The MSC/VLR 32 queries the HLR 16 identified by the call for information. The MSC/VLR 32 receives this routing information, which allows it to find the station where the call originated, and, finally, the mobile device to connect. Communications between the elements are based on Signaling System (SS7) protocols and signaling (SS7 Network 34).

In the high speed data network, the PDSN 28 operates as a client of RADIUS. The client is responsible for passing user information to the designated RADIUS Servers, and then acting on the response which is returned. RADIUS Servers are responsible for receiving user connection requests, authenticating the user, and then returning all configuration information necessary for the client to deliver service to the user.

Figure 2:
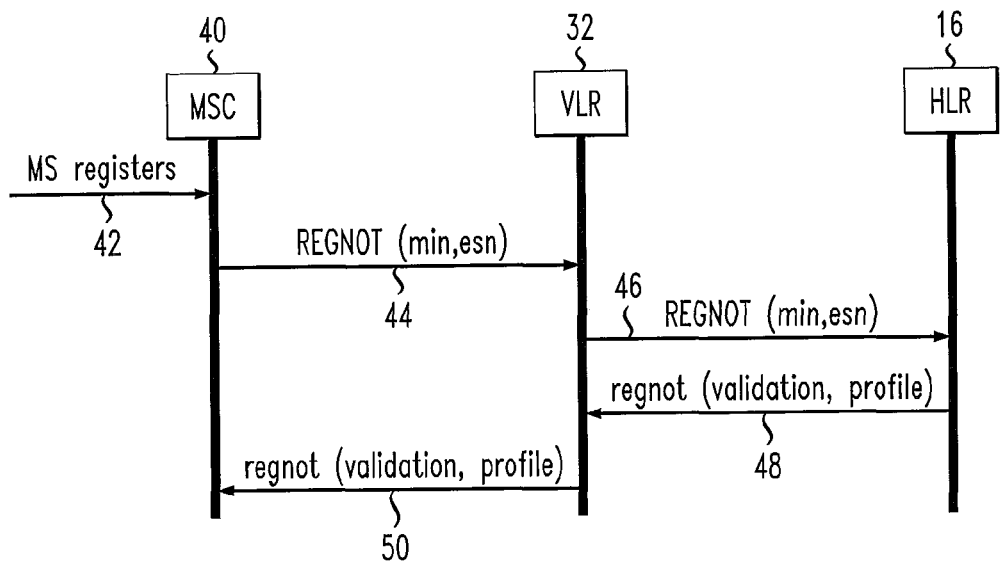
FIG. 2 is a call flow for registration of a voice cellular subscriber in the network shown in FIG. 1.
Figure 3:
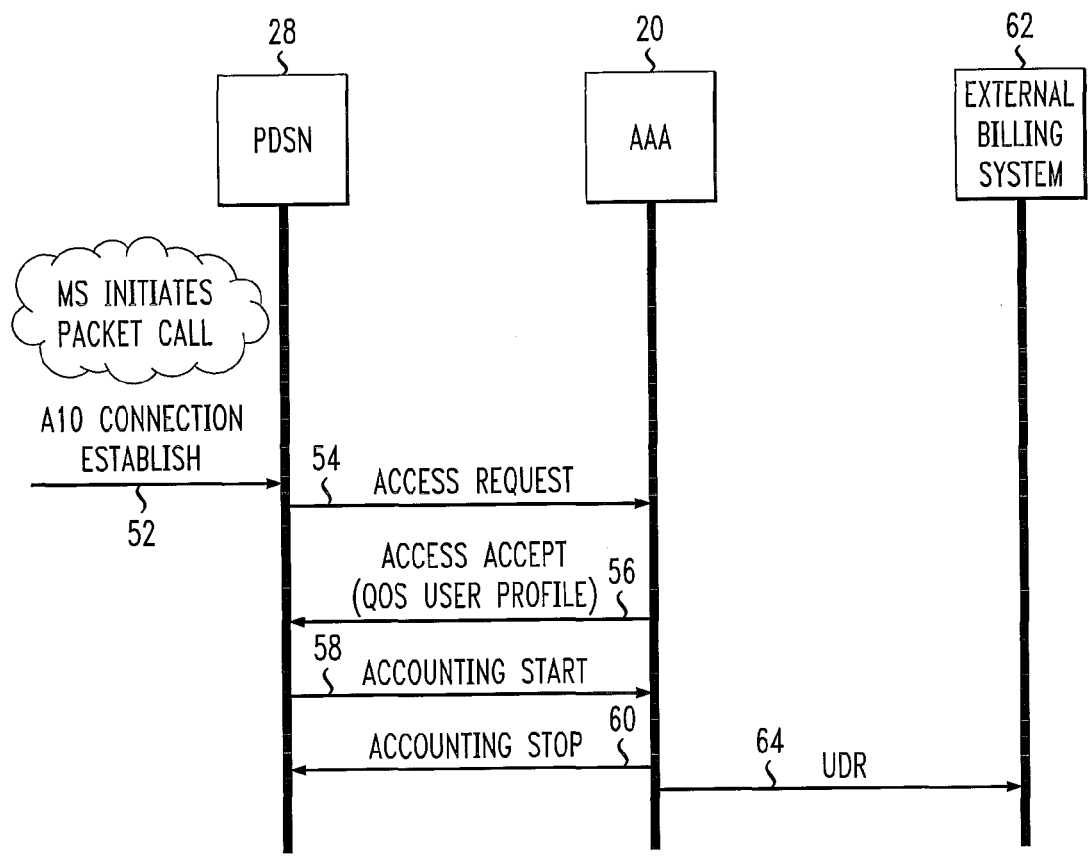
FIG. 3 is a call flow for registration of a high speed data only subscriber in the network shown in FIG. 1.

The call flows for separate registration/authorization of the multimode mobile station 14 are shown in FIG. 2 (for voice) and FIG. 3 (for high speed data).

Turning now to FIG. 2, the mobile station (MS) 14 registers in a voice network (CDMA) with a serving mobile switching center (MSC) 32 (42). In doing so, it sends an ANSI41 registration notification (REGNOT) message to the VLR 32 (44). The VLR 32 figures out that this is a new registration and forwards the REGNOT message to the HLR 16 (46). The HLR 16 stores the address of the serving MSC 32 in its database and returns the profile of the subscriber in the REGNOT return message (48). The VLR 32 builds the subscriber record for this subscriber and forwards the profile in the REGNOT return result message to the serving MSC 32 for further processing of voice related authorization (50).

As shown in FIG. 3, when the subscriber uses the multimode mobile station 14 to initiate a packet call, the PDSN 28 receives the connection establishment request (52). The PDSN 28 then initiates the Access Request message to the AAA RADIUS Server 20 (54). Once the AAA RADIUS Server 20 receives the request, it validates the sending client. If the client is valid, then the AAA RADIUS Server 20 consults a database of users to find the user whose name matches the request. The user entry in the database contains a list of requirements (e.g., passwords, etc) that must be met to allow access for the user. At this point, access is accepted (56)

At the start of service delivery, the PDSN 28 generates an Accounting Start packet describing the type of service being delivered and the user it is being delivered to. It will send the Accounting Start packet to the AAA RADIUS Server 20 (58), which will send back an acknowledgement that the packet has been received. At the end of service delivery the PDSN 28 generates an Accounting Stop packet describing the type of service that was delivered and optionally statistics such as elapsed time, input and output octets, or input and output packets. It will send that packet to the AAA RADIUS Server 20, which will send back an acknowledgement that the packet was received (60). The AAA RADIUS Server 20 then sends the UDR (User Data Record) to an External Billing System 62 (64).

Figure 4:
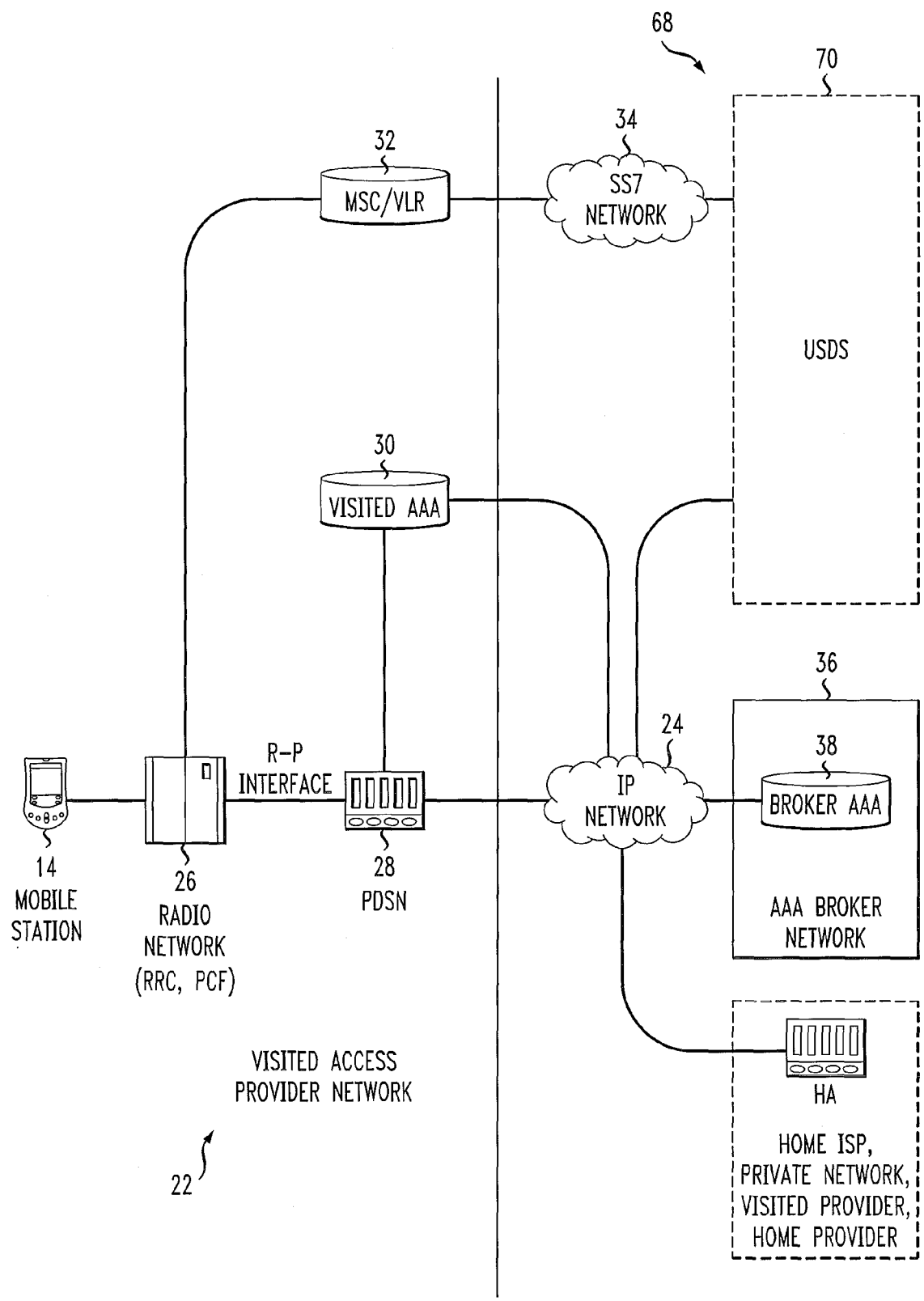
FIG. 4 is a high level block diagram of a data communication network in accordance with aspects of the present invention.

FIG. 4 shows a data communication network 68, which is similar to the data communication network 10 in some respects. As such, like numerals denote like elements. However, FIG. 4 illustrates the unique approach and design offered by this invention, whereby the AAA RADIUS Server function (for data authentication of a multimode subscriber) and the HLR Server function (for voice authentication of a multimode subscriber) are supported as an integral part of a consolidated server platform, such as the MAS (MiLife Application Server) Platform from Lucent Technologies of Murray Hill, N.J., in the form of a Unified Subscriber Data Server (USDS) 70.

Figure 5:
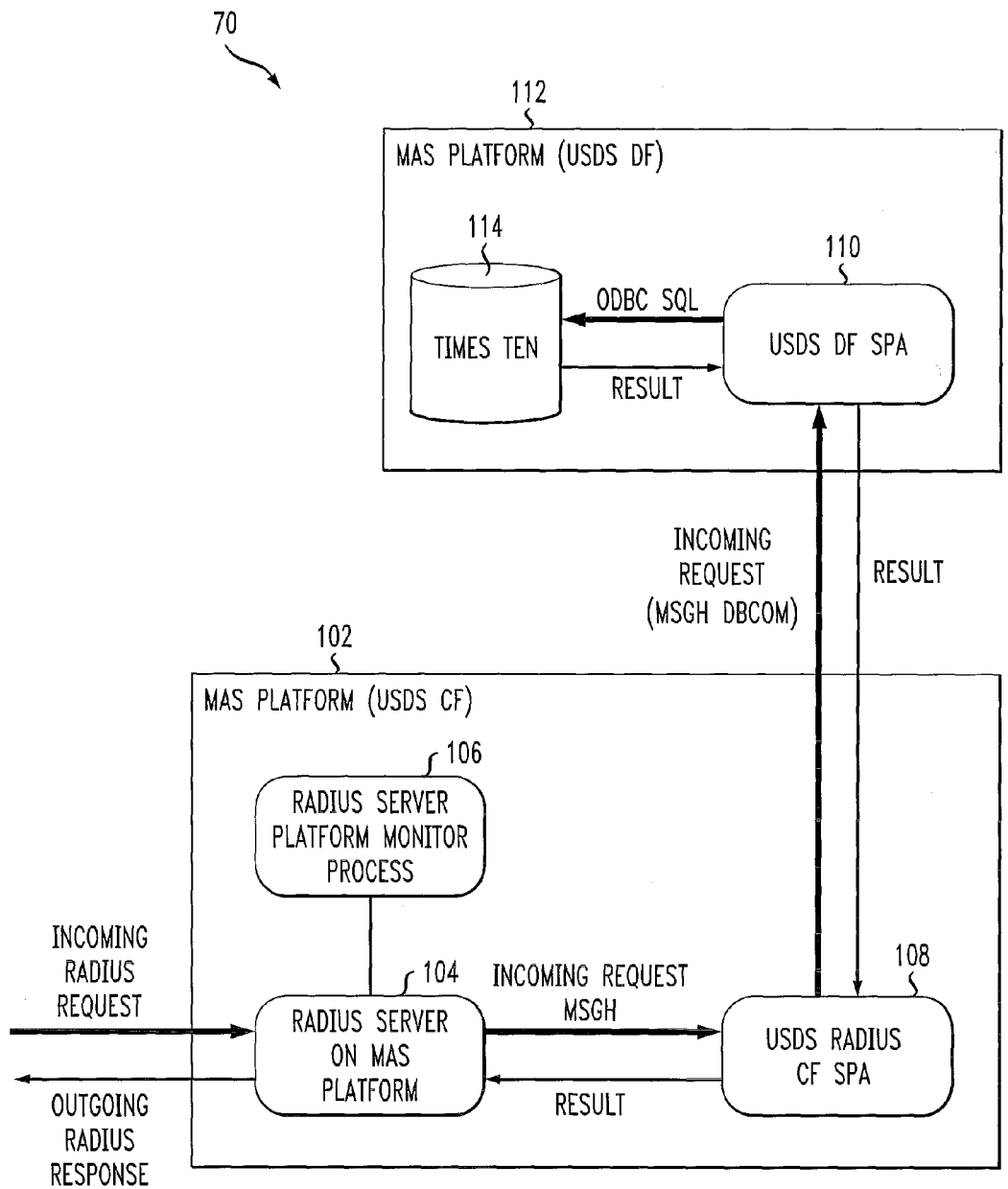
FIG. 5 is a block diagram of a Unified Subscriber Data Server (USDS) in accordance with aspects of the present invention.

The data authentication portion of the USDS 70 is shown in greater detail in FIG. 5. With respect to data authentication, the USDS 70 includes a USDS CF (Unified Subscriber Data Server Control Function) 102 that processes the RADIUS requests. The USDS CF 102 includes a AAA RADIUS Server Program (or Process) 104, which provides a RADIUS interface to client applications for AAA. The AAA RADIUS Server Program 104 may be implemented using any compiled, interpreted and/or other programming environment or the like, including any high or low level programming or scripting languages. In the exemplary embodiment, the AAA RADIUS Server Program 104 is implemented using a language execution environment that provides run-time support, network and other services, and/or other features as appropriate. One example of such an execution environment is the JAVA framework using products and services available from Sun Microsystems of Mountain View, Calif., although equivalent embodiments could utilize the NET products and services available from Microsoft Corporation of Redmond, Wash., as well as any other programming tools, languages, components or the like. The incoming RADIUS requests and outgoing RADIUS response occur on this RADIUS interface.

The USDS CF 102 also provides a Platform Monitor Process (or RADIUS Monitor Process) 106 that handles the initialization, monitoring, and OA&M (operations, administration, and management and is a general term used to describe the costs, tasks involved, or other aspects of operating, administering, and managing something such as a computer network) details for the AAA RADIUS Server Process 104. The RADIUS Monitor Process 106 on the USDS CF 102 initializes and monitors the RADIUS Server Process 104 (which includes the configuration server). The RADIUS Monitor Process 106 running on the USDS CF 102 can also "heartbeat" with the RADIUS Server process 104 (which includes the configuration server process as well) by sending a pre-arranged RADIUS message to the RADIUS Server Process 104. The term "heartbeat" refers to a Monitor Process on the USDS CF that sends messages to the RADIUS Server Process 104 at regular intervals to check the health of the RADIUS Server Process 104, i.e. whether the RADIUS Server Process 104 is alive and functioning well.

The RADIUS Server Process 104 then responds with a "success" message. The policy rules (code) running in the RADIUS Server Process 104 has the pre-arranged response included. The USDS CF can use the following two methods to heartbeat the RADIUS Server Process 104 based on different customer needs.

For example, the USDS CF may periodically send RADIUS packets to the RADIUS Server Process 104 for heartbeating purposes. This involves writing a policy flow to verify the working status of the RADIUS Server Process 104 when it received the RADIUS packet. Such a policy flow would be flexible enough to meet different customers' configurations.

An alternate way which does not depend upon a customer's configuration would be for the MAS Platform Monitor Process 106 to send a specifically defined heartbeat MSGH message to the RADIUS Server MSGH message handler to recognize the heartbeat message.

If an AAA CF SPA 108 is not yet initialized or is not available, the RADIUS Server Process 104 will begin to listen for AAA CF SPA registration messages in order to register the AM CF SPA queues. The general function of the SPA (Service Package Application) is to control all the application processes and input/output messages to all the events pertaining to the AAA application. Queue registration is handled by the AAA CF SPA 108 and does not require platform development. Queries received by the platform prior to AAA CF queue registration that require additional data will not receive a response. Retry logic is left to the RADIUS client.

When the AAA CF SPA 108 is available or the MAS Platform Monitor Process has restarted the RADIUS Server Process 104, the SPA will need to re-register its queues with the RADIUS Server process. The method used (e.g., heartbeating, etc) to detect whether the RADIUS Server Process 104 is dead is the responsibility of the AAA CF SPA 108. Any queries that are attempted by the RADIUS client and require additional data will not receive a response and be subject to their retry strategy.

The USDS CF 102 may also support a RADIUS Server Management Tool (not shown), which may be part of the RADIUS Server Process 104. This tool can be invoked through UNIX shell and can be run directly on the USDS CF 102 to configure and manage the RADIUS Server Process 104. All MAS Platform configuration parameters for the RADIUS Server Process 104 are changeable using a graphical user interface (GUI). The RADIUS Server configuration parameters are changeable with the RADIUS Server configuration file or by using the RADIUS Server management tool. The USDS CF 102 may have an input command to manually start and stop the RADIUS Server and configuration server processes. An output message may also be generated when one of the RADIUS processes is started or re-started. The measurements for the RADIUS Server Process 104 are typically visible through the RADIUS Server Management Tool.

The RADIUS Server Process 104 generally writes AAA accounting records to a disk partition (a file in the open directory) on the USDS CF 102. Every X minutes the NavisRADIUS Proxy SPA will move the accounting records from the open directory to the ready directory. The NavisRADIUS Proxy SPA may be part of the RADIUS Server Process 104. Each file storing the accounting records will have a unique name based on the date and time. X is generally a configurable number with a default of 15 minutes. The disk partition is sized for a minimum of 100 Megabytes and is mirrored. Further, the disk partition is to be preserved over retrofits. A configurable minor alarm water mark and a configurable major alarm water mark for identifying when the disk partition is close to full may be included.

Different vendors' log files are supported such that the RADIUS Server Process 104 may be configured to write log files on the USDS CF 102. These log files will generally have a unique prefix to distinguish them from log files of different vendors. For example:

RADIUS Server log may be written to RADIUS.log
Universal State Server log may be written to uss.log
Configuration Server log may be written to guiserver.log
RMI Server log may be written to rmiregistry.log In addition, the USDS CF 102 generally schedules a periodic cleanup process to maintain the size of the RADIUS log files. The cleanup process may run, for example, every few hours.

The RADIUS Server Monitor Process 106 monitors the RADIUS Server log activity for alarm messages. At a minimum, major and minor alarms are to be generated. All RADIUS Server log messages of level 1 (error) generate a major alarm at the USDS CF 102. All RADIUS Server log messages of level 2 (warning) generate a minor alarm at the USDS CF 102. All NavisRADIUS log messages of level 3 (notice) are used to generate a clear alarm event at the USDS CF 102. Alarms are generated at the USDS CF 102 and appear in the logfile. Alarms are X.731/ X.733 compliant formats for propagation to an OMC-H (not shown).

Figure 7:
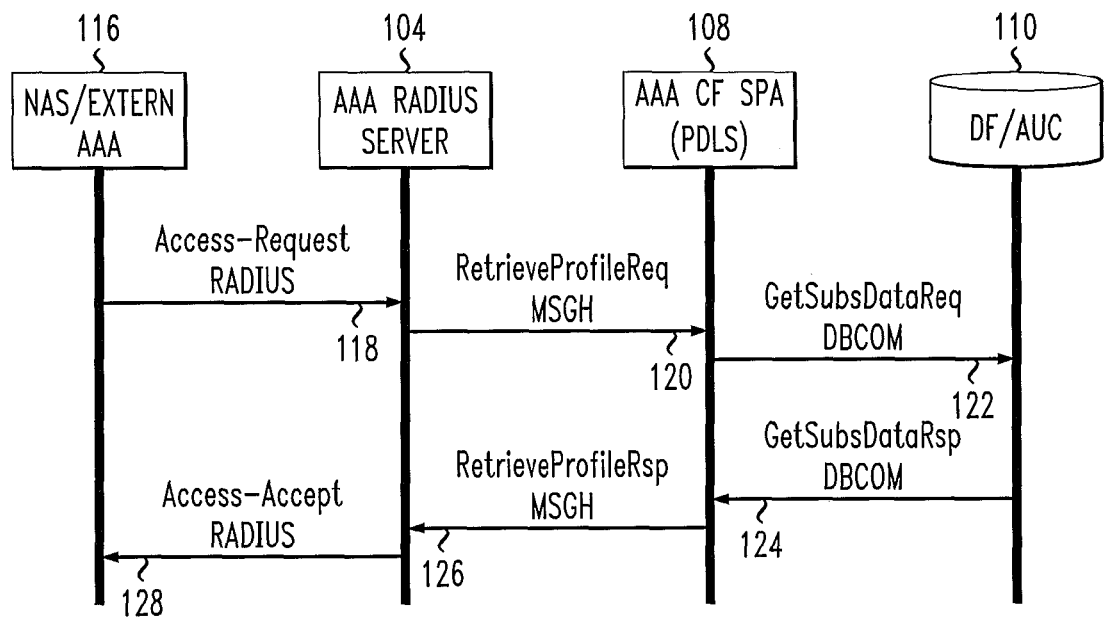
FIG. 7 is a call flow for registration of a multimode mobile station in a data network in accordance with aspects of the present invention.

This innovatively designed RADIUS Server Process 104 on the USDS CF 102 also develops a set of MSGH messages to communicate with the USDS RADIUS AAA CF SPA 108 as shown in FIG. 7. The USDS RADIUS AAA CF SPA 108 also develops any number of DBCOM messages to communicate with the USDS DF SPA (Unified Subscriber Data Server Data Function Service Package Application) 110 on the USDS DF 112. The USDS DF SPA 110 retrieves data from a database (e.g., Oracle TimesTen In-Memory Database or other suitable database) 114 using ODBC/SQL.

Message Handler (MSGH) is a C++ application originally developed using the APIs. The application consists of an executable program, perhaps coupled with other support files and interfaces required by the platform components, e.g., the INIT and MSGH components. MSGH is a protocol for interprocess communication facilities. MSGH supports an efficient, common message transport capability used by other platform processes. In short, the Message Handler (MSGH) subsystem is a call-processing software subsystem that controls the communication channels among all of the subsystems. The MSGH subsystem is the interprocess communication transport (message router) for all the subsystems. By installing all of the communication primitives and standards in this single subsystem, the details of how to pass messages are hidden from the other subsystems.

The MSGH API is also available for service applications to use for inter-process communication, including across Application Server nodes. MSGH is a protocol that allows for optimized data queries between Application Servers and Data Servers.

The DBCOM interface (not shown) is the interface between an HLR Data Function (DF) and an HLR Control Function (CF). This is the interface that handles all of the queries and the updates coming from the network. The intent of this interface is to wrap the building of messages to and from the HLR CF in such a way that the details of the messaging transport medium does not have to be known. Canned queries will be provided so that the HLR CF can easily and quickly get access to the data.

The Oracle TimesTen In-Memory Database 114 runs on the major Unix/Linu platforms and on various Windows platforms, in both 32-bit and 64-bit modes. Standard support includes Open Database Connectivity (ODBC) and Java Database Connectivity (JDBC) interfaces and the Structured Query Language (SQL) query language.

Figure 6:
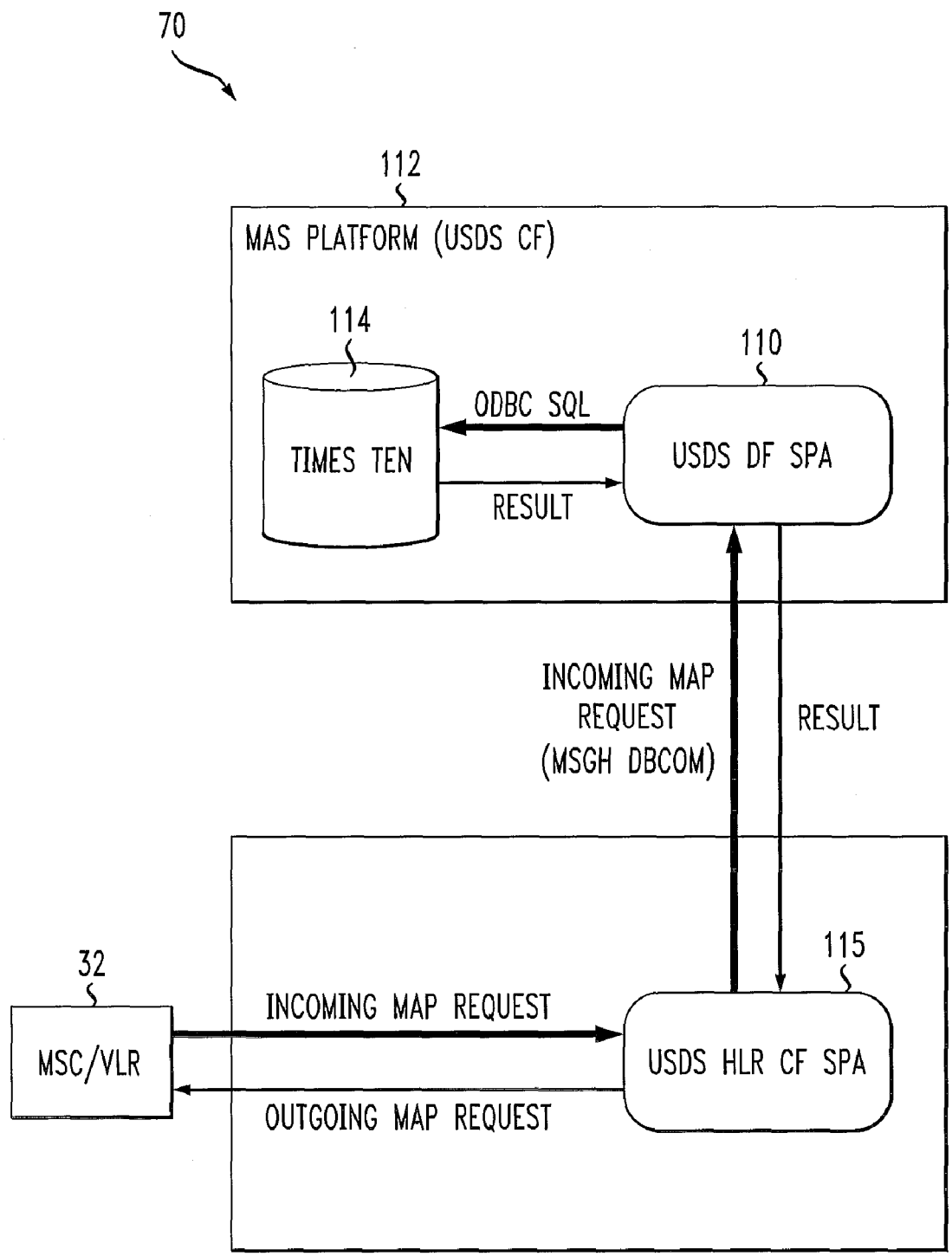
FIG. 6 is an alternate view of the Unified Subscriber Data Server (USDS) in accordance with aspects of the present invention.

The voice authentication portion of the USDS 70 is shown in greater detail in FIG. 6. In this case, a USDS HLR CF SPA 115 receives an incoming MAP (Mobile Application Part) Request from the MSC/VLR 32. The USDS HLR CF SPA 115 communicates with USDS DF SPA using MSGH and DBCOM messages as well.

A call flow for the messages showing the communication between the USDS CF 102, the RADIUS Server Process 104 and the USDS SPAs 108, 110 is shown in FIG. 7. These messages are to be used to retrieve the subscription data for the multimode (e.g., voice and data) subscriber.

Initially, an AAA query from an external AAA Server 116 is received by the AAA RADIUS Server process 104 on the USDS CF 102 via RADIUS/UDP (118).

The RADIUS Server Process 104 determines that further information is necessary from the USDS 70 and sends the query to the AAA CF SPA using MSGH to one of the queues that has been registered with the RADIUS Server Process 104 (120)

The AAA CF SPA 108 requires access to some data (e.g., subscriber profile information) and makes a query to the USDS DF SPA 110 via DBCOM (122).

The data returns from the USDS DF SPA 110 to the USDS CF SPA 108 on the USDS CF 102 (124).

The USDS CF SPA 108 returns the response to the RADIUS Server Process 104 (126).

The RADIUS Server Process 104 returns a RADIUS/UDP response to the RADIUS client 116 that made the original request (128).

Figure 8:
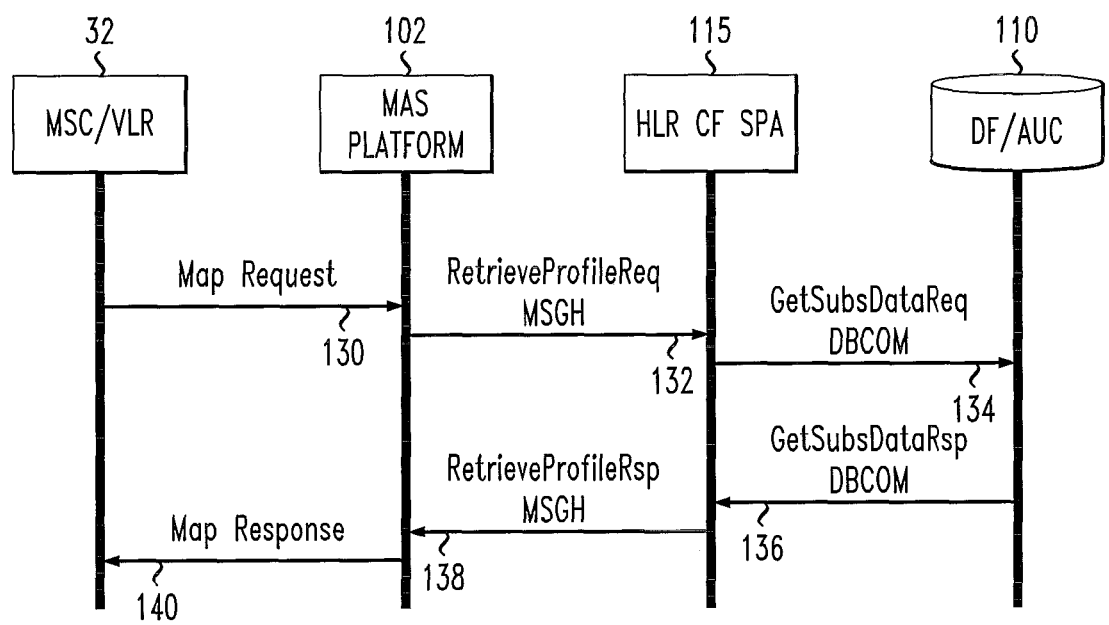
FIG. 8 is a call flow for registration of a multimode mobile station in a voice network in accordance with aspects of the present invention.

A call flow for the messages showing the communication between the MSC/VLR 32, the USDS CF 102, the HLR CF SPA 115 and the USDS DF SPA 110 is shown in FIG. 8. These messages are to be used to retrieve the subscription data for the multimode (e.g., voice and data) subscriber.

Initially, a MAP (Mobile Application Part) Request from the MSC/VLR 32 is received by the USDS CF 102 (130).

The USDS CF 102 determines that further information is necessary from the USDS 70 and sends the query to the USDS HLR CF SPA 115 using MSGH (132)

The HLR CF SPA 115 requires access to some data and makes a query to the USDS DF SPA 110 via DBCOM (134).

The data returns from the USDS DF SPA 110 to the USDS HLR CF SPA 115 on the USDS CF 102 (136).

The USDS HLR CF SPA 115 returns the response to the USDS CF 102 (138).

The USDS CF 102 returns a MAP response to the MSCNLR 32 that made the original request (140).

Thus, this invention provides a unique approach based upon class of service. That is, it provides for concurrent registration mechanisms for multimode mobile stations.

When the USDS 70 checks the registration status into the subscriber profile, there could be scenarios when the subscriber is registered in the EVDO network for data as well as cellular network for voice. Since this server will know exactly in what data and voice networks the subscriber is registered, this design lays out a comprehensive infrastructure to provide the interworking call-delivery treatment (voice and data) to a multimode subscriber after determining whether or not a multireqistered User Agent (UA) is reachable.

FIGS. 9-15 illustrate various examples of COS (class of service) layouts for different protocol subscribers (e.g., voice and data). It is to be understood that other COS layouts may be employed in accordance with the present invention.

Figure 9:
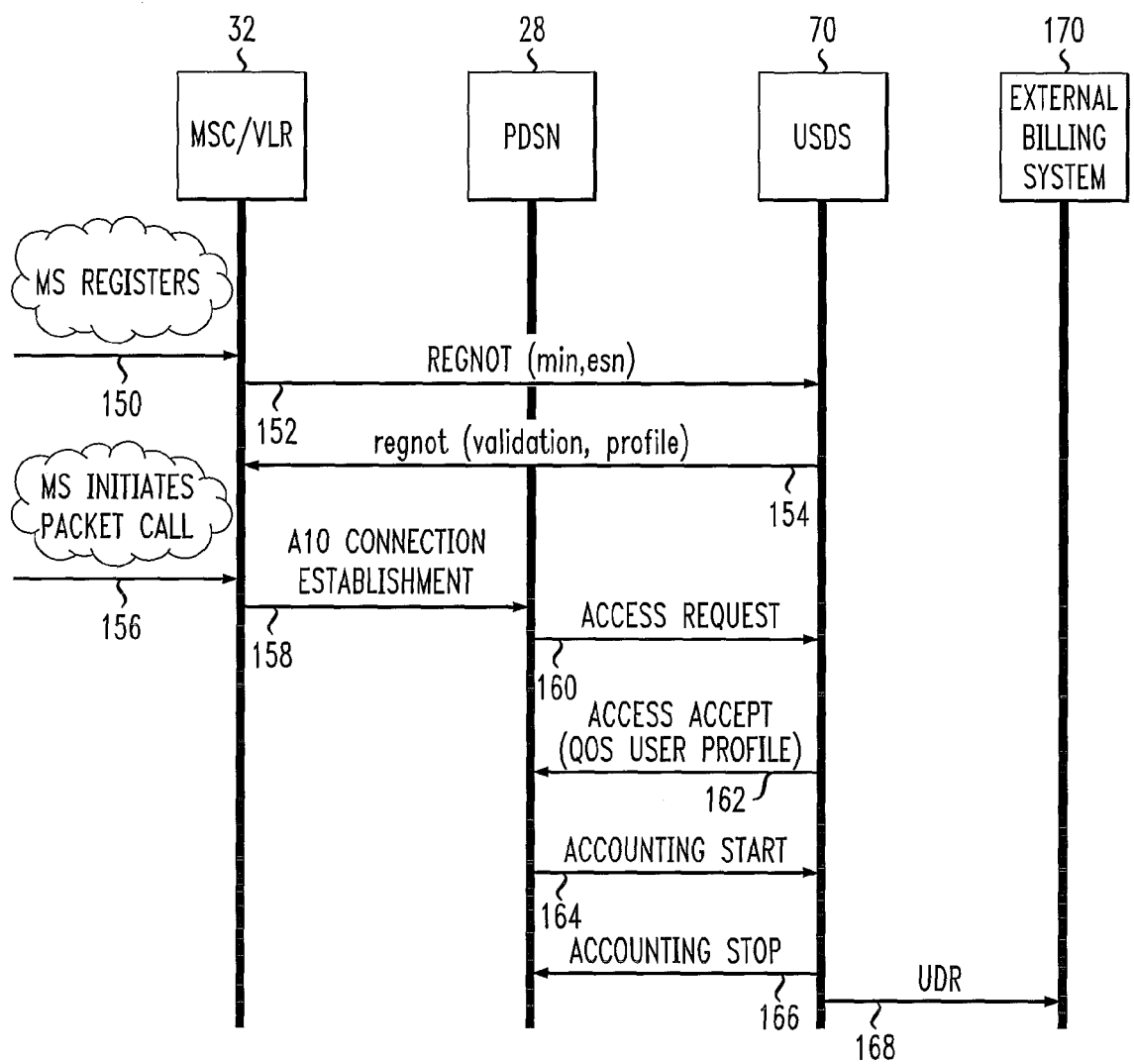
FIG. 9 is a call flow for concurrent registration of a multimode mobile station in a network featuring voice (CDMA) and data (EVDO and WiFi/WiMax)

In the first example, the multimode subscriber subscribes to the CDMA (voice), EVDO (data) and WiFi/WiMax networks and is assigned class of service 1 in the centralized database server (i.e., the USDS 70). Thus, as shown in FIG. 9, when the multimode subscriber registers concurrently in the voice and high speed data (packet call) networks (150), then the ANSI41 registration notification (REGNOT) and RADIUS Access Request messages are sent to the consolidated server (i.e., the USDS 70) (152). The USDS 70 stores the address of the serving MSC 40/MSC/VLR 32 in its database. The USDS 70 validates the subscriber and returns the profile of the subscriber in the REGNOT return message (154). The mobile station 14 then initiates a packet call (156). As a result, an A10 connection is established between the MSCNLR 32 and the PSDN 28 (158). An Access Request message is sent to the USDS 70 (160).

Once the USDS 70 receives the request, it validates the sending client. If the client is valid, then the USDS 70 consults a database of users to find the user whose name matches the request. The user entry in the database contains a list of requirements (e.g., passwords, etc) that must be met to allow access for the user. In this example, access is accepted (162).

At the start of service delivery, the PDSN 28 generates an Accounting Start packet describing the type of service being delivered and the user it is being delivered to. It sends the Accounting Start packet to the USDS 70 (164), which sends back an acknowledgement that the packet has been received. At the end of service delivery the PDSN 28 generates an Accounting Stop packet describing the type of service that was delivered and optionally statistics such as elapsed time, input and output octets, or input and output packets. The Accounting Stop packet is sent to the USDS 70, which sends back an acknowledgement that the packet was received (166). The USDS 70 then sends a UDR (User Data Record) to an External Billing System 170 (168).

Figure 10:
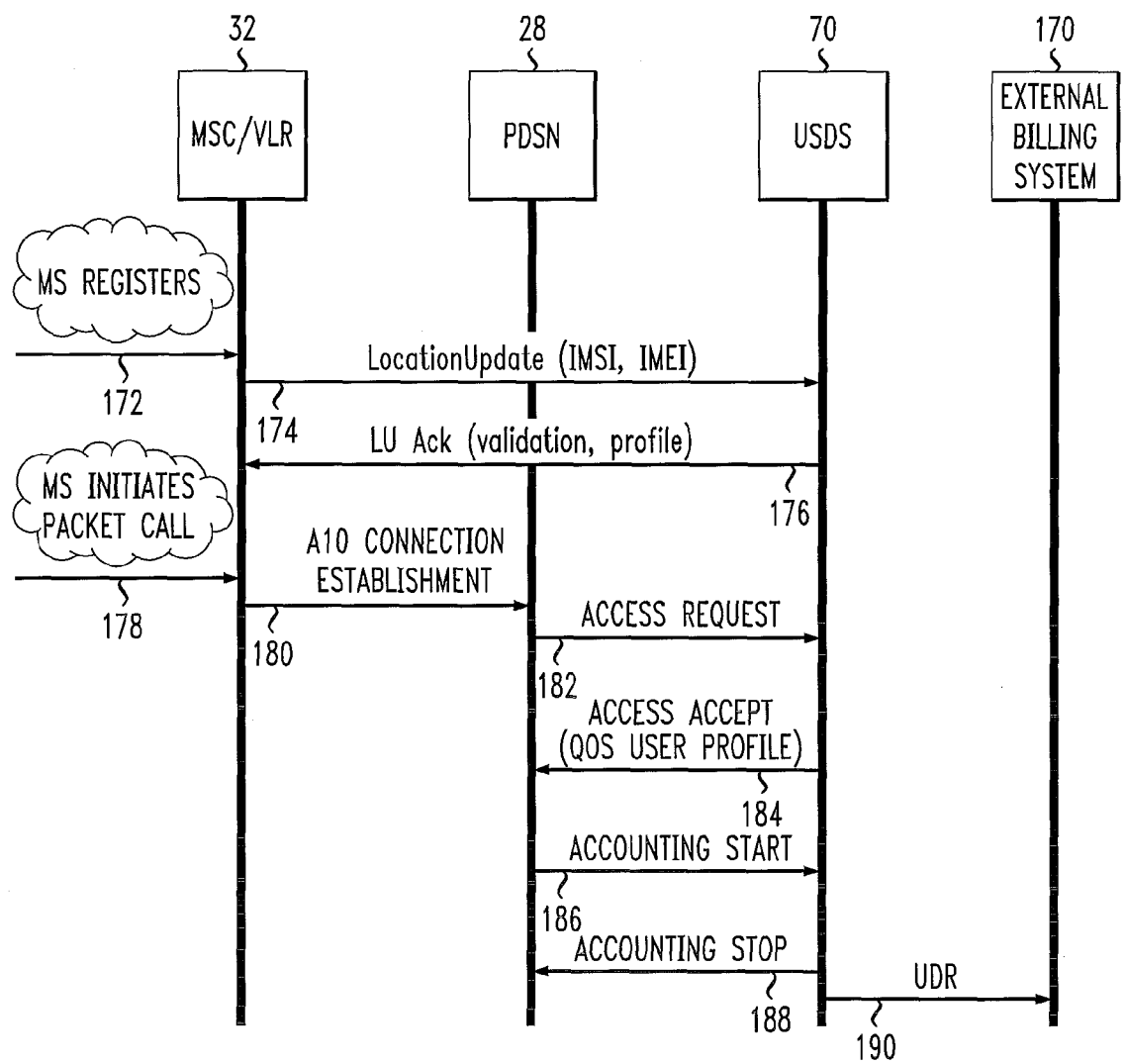
FIG. 10 is a call flow for concurrent registration of a multimode mobile station in a network featuring voice (GSM) and data (UMTS and WiFi/WiMax)

In the second example, a COS value of 2 is assigned in the USDS 70 to the multimode subscriber who subscribes to the GSM (voice), UMTS (data) and WiFi/WiMax (data) networks. As shown in FIG. 10, when this subscriber registers concurrently in the GSM, UMTS and WiFi/WiMax networks, the Location Update (for GSM and UMTS) and Access Request (for RADIUS) messages are sent to the USDS 70.

More particularly, once the mobile station 14 registers with the MSC/VLR 32 (172), a Location Update message is sent to the USDS 70 (174). The USDS 70 validates the subscriber and returns the profile of the subscriber in the Location Update Acknowledgement message (176). At this point, the mobile station 14 initiates a packet call (178). An A10 connection is established (180), and an Access Request message is sent from the PSDN 28 to the USDS 70 (182). Once the USDS 70 receives the request, it validates the sending client. If the client is valid, then the USDS 70 consults a database of users to find the user whose name matches the request. In this example, access is accepted (184).

At the start of service delivery, the PDSN 28 generates an Accounting Start packet describing the type of service being delivered and the user it is being delivered to. It sends the Accounting Start packet to the USDS 70 (186), which sends back an acknowledgement that the packet has been received. At the end of service delivery, the PDSN 28 generates an Accounting Stop packet describing the type of service that was delivered and optionally statistics such as elapsed time, input and output octets, or input and output packets. The Accounting Stop packet is sent to the USDS 70, which sends back an acknowledgement that the packet was received (188). The USDS 70 then sends a UDR (User Data Record) to the External Billing System 170 (190).

Figure 11:
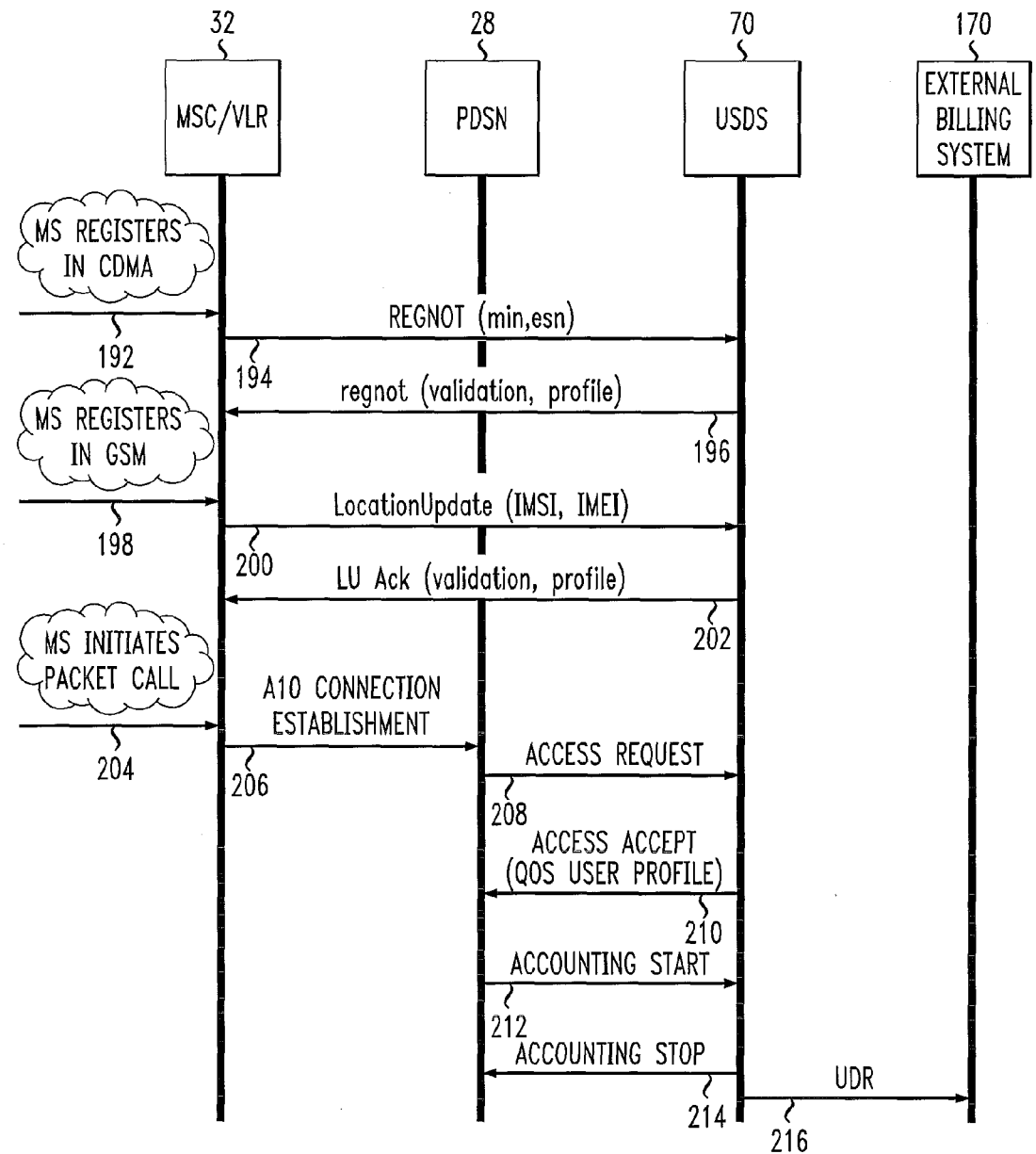
FIG. 11 is a call flow for concurrent registration of a multimode mobile station in a network featuring voice (CDMA and GSM) and data (UMTS, EVDO, and WiFi/WiMax)

In the third example (COS value of 3) the call flow for concurrent registration with the CDMA (voice), GSM (voice), EVDO (data), UMTS (data) and WiFi/WiMax (data) networks is shown in FIG. 11. Initially, the mobile station 14 registers in the CDMA network (192). A registration notification (REGNOT) message is sent to the USDS 70 (194). The USDS 70 stores the address of the serving MSC/VLR 32 in its database. The USDS 70 validates the subscriber and returns the profile of the subscriber in the REGNOT return message (196). Next, the mobile station 14 registers in the GSM network (198). A location update message is sent to the USDS 70 (200), which responds with a location update acknowledgement, which includes the validation and subscriber profile (202).

The mobile station 14 then initiates a packet call (204). An A10 connection is established with the PSDN 28 (206). An Access Request message is sent to the USDS 70 (208), which validates the subscriber and responds with an Access Accept message, including the user profile (210). At the start of service delivery, the PDSN 28 generates an Accounting Start packet describing the type of service being delivered and the user it is being delivered to. It sends the Accounting Start packet to the USDS 70 (212), which sends back an acknowledgement that the packet has been received. At the end of service delivery, the PDSN 28 generates an Accounting Stop packet describing the type of service that was delivered and optionally statistics such as elapsed time, input and output octets, or input and output packets. The Accounting Stop packet is sent to the USDS 70, which sends back an acknowledgement that the packet was received (214). The USDS 70 then sends a UDR (User Data Record) to the External Billing System 170 (216).

Figure 12:
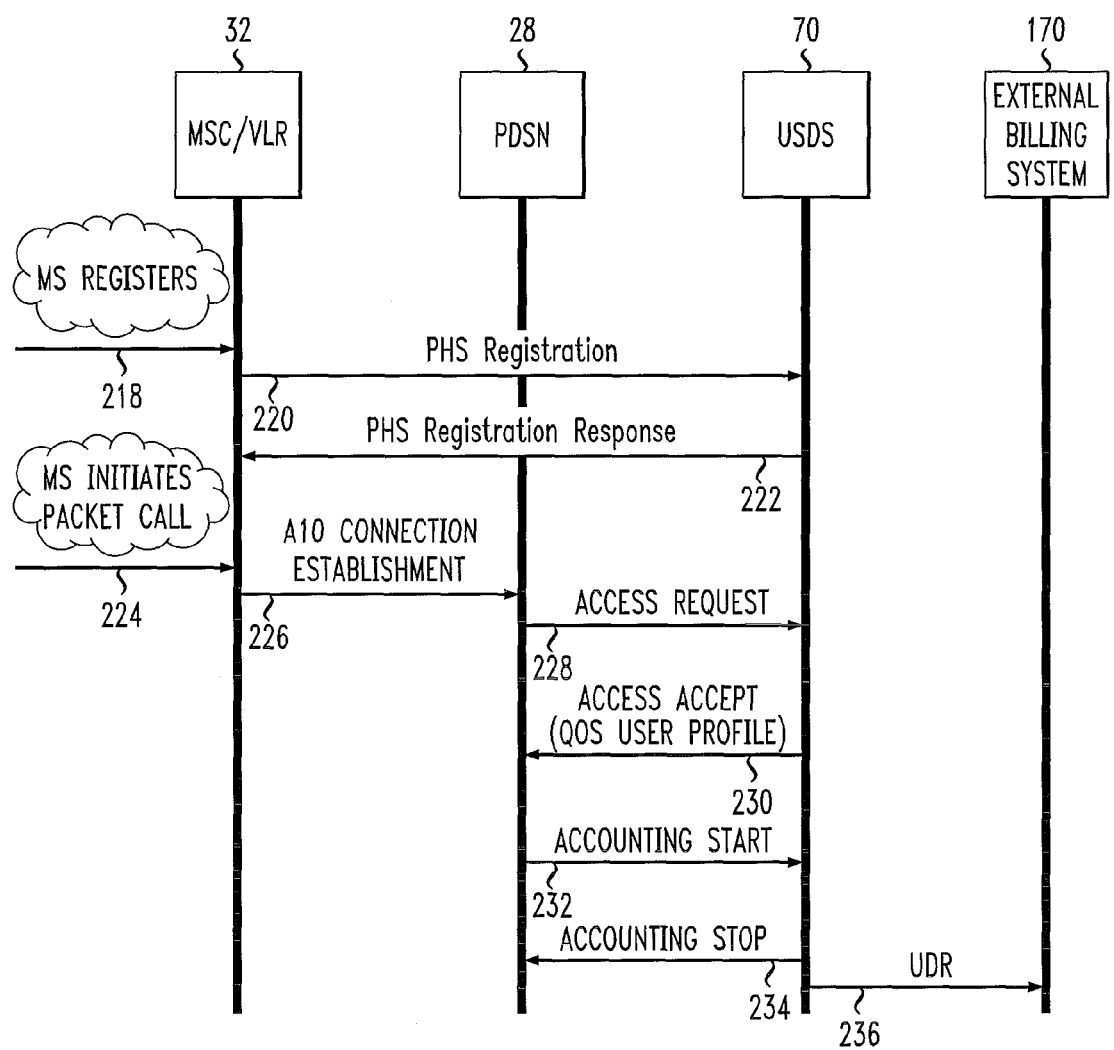
FIG. 12 is a call flow for concurrent registration of a multimode mobile station in a network featuring voice (PHS) and data (PHS and WiFi/WiMax)

In the fourth example (COS value of 4), the call flow for concurrent registration of a subscriber to PHS (voice and data) and WiFi/WiMax (data) is shown as in FIG. 12. Initially, the mobile station 14 registers in the PHS (Personal Handyphone System) network (218). The PHS registration message is sent to the USDS 70 (220), which responds with a PHS registration response message (222). Next, the mobile station 14 initiates a packet call (224). An A10 connection is established (226). An Access Request message is sent to the USDS 70 (228), which verifies the subscriber and responds with an Access Accept message (230).

At the start of service delivery, the PDSN 28 generates an Accounting Start packet describing the type of service being delivered and the user it is being delivered to. It sends the Accounting Start packet to the USDS 70 (232), which sends back an acknowledgement that the packet has been received. At the end of service delivery, the PDSN 28 generates an Accounting Stop packet describing the type of service that was delivered and optionally statistics such as elapsed time, input and output octets, or input and output packets. The Accounting Stop packet is sent to the USDS 70, which sends back an acknowledgement that the packet was received (234). The USDS 70 then sends a UDR (User Data Record) to the External Billing System 170 (236).

Figure 13:
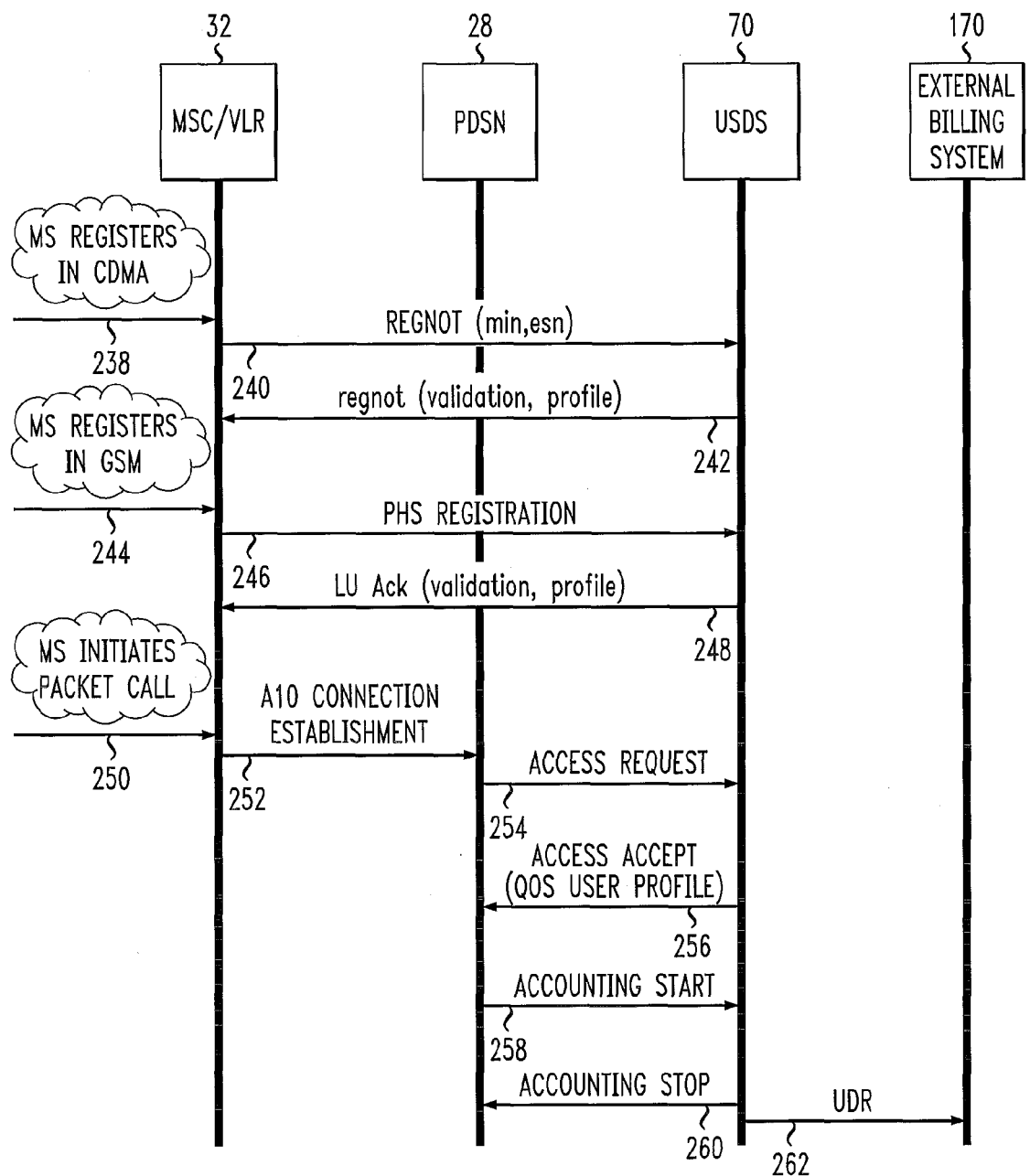
FIG. 13 is a call flow for concurrent registration of a multimode mobile station in a network featuring voice (CDMA and PHS) and data (EVDO, PHS, and WiFi/WiMax)

In the fifth example (COS value of 5), the call flow for concurrent registration of a subscriber to CDMA (voice and data), PHS (voice and data), and WiFi/WiMax (data) technologies is shown in FIG. 13. The mobile station 14 registers in the CDMA network (238). A registration notification (REGNOT) message is sent to the USDS 70 (240). The USDS 70 stores the address of the serving MSC/VLR 32 in its database. The USDS 70 validates the subscriber and returns the profile of the subscriber in the REGNOT return message (242). Next, the mobile station 14 registers in the GSM network (244). A PHS registration message is sent to the USDS 70 (246), which validates the subscriber and responds with a location update acknowledgement message, including the validation and subscriber profile (248). The mobile station 14 then initiates a packet call (250). An A10 connection is established (252). An access request message is sent to the USDS 70 (254), which responds with an access accept message (256).

At the start of service delivery, the PDSN 28 generates an Accounting Start packet describing the type of service being delivered and the user it is being delivered to. It sends the Accounting Start packet to the USDS 70 (258), which sends back an acknowledgement that the packet has been received. At the end of service delivery, the PDSN 28 generates an Accounting Stop packet describing the type of service that was delivered and optionally statistics such as elapsed time, input and output octets, or input and output packets. The Accounting Stop packet is sent to the USDS 70, which sends back an acknowledgement that the packet was received (260).

The USDS 70 then sends a UDR (User Data Record) to the External Billing System 170 (262).

Figure 14:
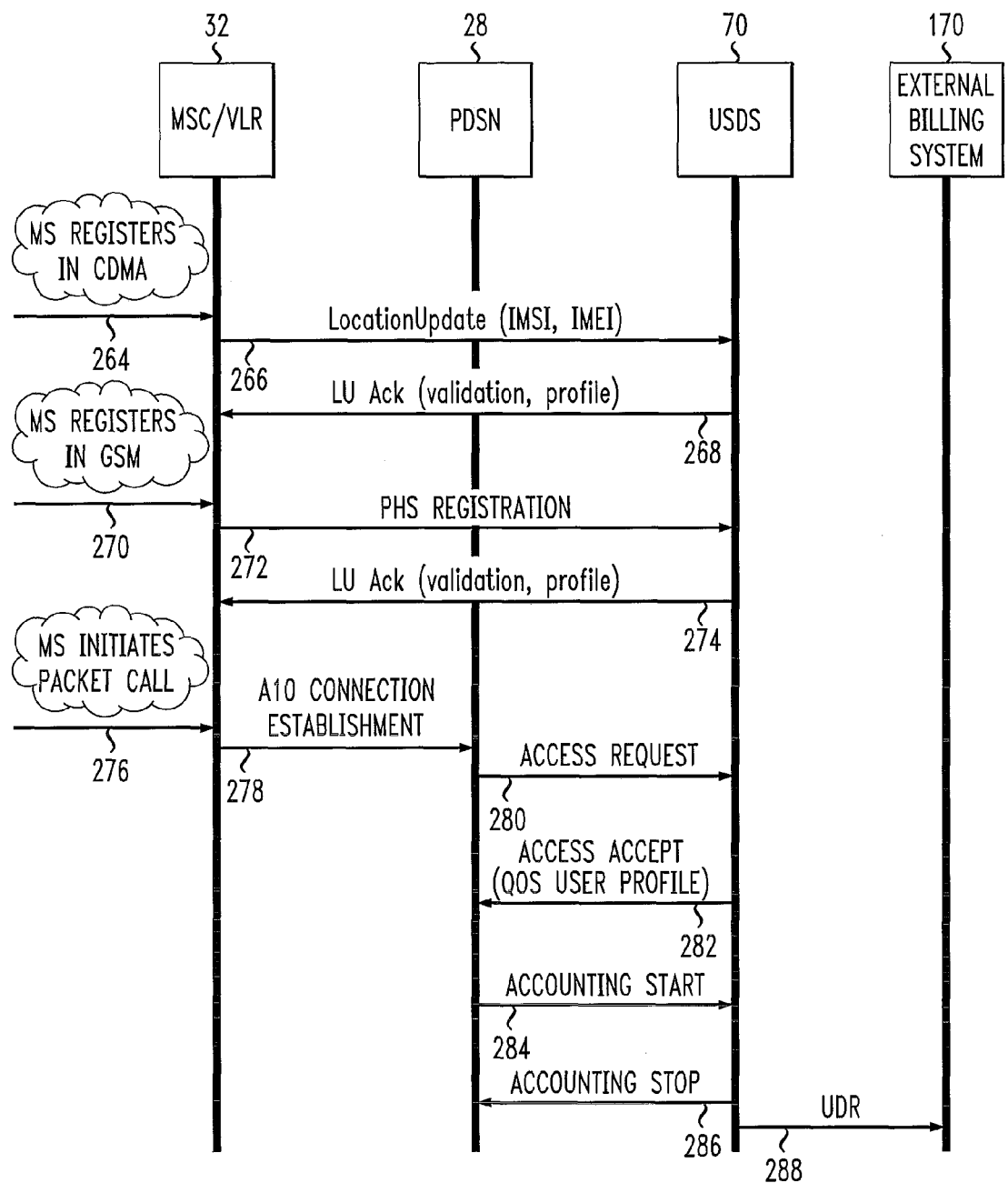
FIG. 14 is a call flow for concurrent registration of a multimode mobile station in a network featuring voice (UMTS and PHS) and data (UMTS, PHS, and WiFi/WiMax)

In the sixth example (COS value of 6), the call flow for concurrent registration of a subscriber to GSM, UMTS, PHS and WiFi/WiMax is shown in FIG. 14. Initially, the mobile station 14 registers in the CDMA network (264). A location update message is sent to the USDS 70 (266), which responds with a location acknowledgement (268). The mobile station 14 then registers in the GSM network (270). A PHS registration message is sent to the USDS 70 (272), which validates the subscriber and responds with a location update acknowledge message, including the validation and subscriber profile (274). The mobile station 14 then initiates a packet call (276). An A10 connection is established (278). An Access Request is sent to the USDS 70 (280), which validates the subscriber and responds with an Access Accept message (282).

At the start of service delivery, the PDSN 28 generates an Accounting Start packet describing the type of service being delivered and the user it is being delivered to. It sends the Accounting Start packet to the USDS 70 (284), which sends back an acknowledgement that the packet has been received. At the end of service delivery, the PDSN 28 generates an Accounting Stop packet describing the type of service that was delivered and optionally statistics such as elapsed time, input and output octets, or input and output packets. The Accounting Stop packet is sent to the USDS 70, which sends back an acknowledgement that the packet was received (286). The USDS 70 then sends a UDR (User Data Record) to the External Billing System 170 (288).

Figure 15:
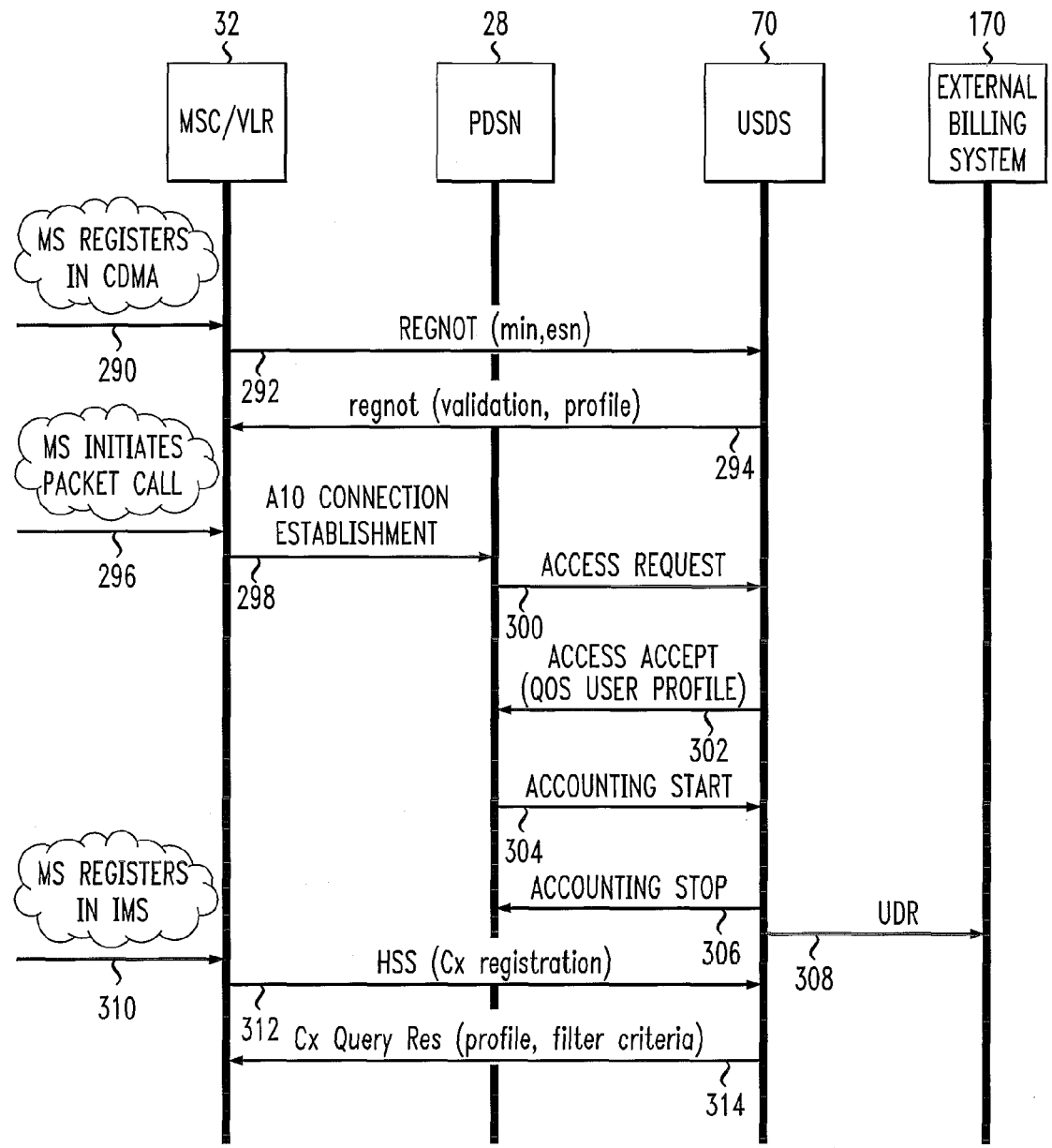
FIG. 15 is a call flow for concurrent registration of a multimode mobile station in a network featuring voice (CDMA and IMS) and data (EVDO and IMS).

In the seventh example (COS value of 7), FIG. 15 shows a call for a subscriber to CDMA, EVDO, WiFi/WiMax and IMS networks. Initially, the mobile station 14 registers in the CDMA network (290). A registration notification (REGNOT) message is sent to the USDS 70 (292). The USDS 70 stores the address of the serving MSC/VLR 32 in its database. The USDS 70 validates the subscriber and returns the profile of the subscriber in the REGNOT return message (294). Next, the mobile station 14 initiates a packet call (296). An A10 connection is established (298). An access request is sent to USDS 70 (300), which responds with an access accept message (302).

At the start of service delivery, the PDSN 28 generates an Accounting Start packet describing the type of service being delivered and the user it is being delivered to. It sends the Accounting Start packet to the USDS 70 (304), which sends back an acknowledgement that the packet has been received. At the end of service delivery, the PDSN 28 generates an Accounting Stop packet describing the type of service that was delivered and optionally statistics such as elapsed time, input and output octets, or input and output packets. The Accounting Stop packet is sent to the USDS 70, which sends back an acknowledgement that the packet was received (306). The USDS 70 then sends a UDR (User Data Record) to the External Billing System 170 (308).

The mobile station 14 then registers on the IMS network (310). An HSS message is sent to the USDS 70 (312), which validates the subscriber and responds with a Cx Query response, including the subscriber profile and filter criteria (314).

This invention may be applicable to other access technologies along with IMS combinations defined as COS for the multi-mode subscriber in the centralized state server (USDS 70).

The unique aspects of this invention enable the concurrent registration of voice and data for a multimode subscriber and furthermore lay an infrastructure for the customizations to choose necessary protocols that facilitates efficient protocol interworking between voice and data.

The centralized server (USDS 70) maintains:
the class of service information about active protocol registrations based upon real-time in-memory current session database;
the most versatile policy flow corresponding to the multi-protocol subscriber data based upon built-in full programming language for creating the customized access and accounting policies;
the secure exchange of messages between the inbuilt platform based AAA server and the data function; and
a modular structure with the multi-protocol call-logic on N+K configuration.

There are numerous advantages to the novel approach outlined above. For example, this architecture provides a flexible mechanism to provide concurrent registration for voice and data on the same platform, to store the subscription data (for voice and data subscribers) at a common place and to perform call-processing either on the same box where the data is stored or on a different box using a distributed N+K configuration. Control servers are generally deployed in an "N+K" configuration for reliability and scalability, where "N" servers provide the engineered performance level and "K" servers provide the required availability.

Any operator can easily launch services such as data, voice, Internet, and messaging without the extensive provisioning project on different platforms. The new opportunities and complex services including presence, video, chat, messaging, etc. can be implemented, tested, even billed without modifying the core mobile network.

One advantage is that a service provider can use the unified voice and data solution on the USDS-DF to diversify its mass market services portfolio running over high-speed data and voice networks. By making the registration/authorization of the "data" subscribers a MAS Platform process on the USDS CF, the Service Provider can then use up the freed SPA (application) resources on the CF to focus on upgrading and delivering voice, high speed data, and core networks for the mobile users.

The other benefits of this invention are described below. For example, the service provider does not have to maintain different boxes for different networks/services like Cable, DSL, WiFi/WiMax, IMS, Cellular, data, etc. This results in lower operating costs as only one box needs to be maintained.

Also, there is a corresponding reduction in maintenance of SS7/IP based translations in the network because of the common box solution for multiple voice and data registration/authorization boxes.

Since the RADIUS Server is part of the platform, it frees up the application resources to focus on the data interworking for the multiple protocols. There is a single logical record for the multimode voice and data subscriber. Moreover, there is a separation of service logic and subscriber data.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A multimode mobile station registration method comprising:
receiving an authentication, authorization, and accounting (AAA) query from an external server at a RADIUS server process on a unified subscriber data server control function platform, wherein the unified subscriber data server control function platform maintains class of service information about active protocol registrations and performs concurrent data network registration and voice network registration for multimode subscribers;

forwarding the AAA query to a AAA control function application on the unified subscriber data server control function platform;

requesting data relating to the AAA query from a data function application on the unified subscriber data server data function platform;

receiving data relating to the AAA query from the data function application;

returning a response to the AAA query to the RADIUS server process;

forwarding the response to the AAA query to the external server.

2. The method defined in claim 1, further comprising:
receiving a mobile application part (MAP) request from a serving mobile switching center/visiting location register (MSC/VLR) at the unified subscriber data server control function platform;

forwarding the MAP request to a home location register (HLR) control function application on the unified subscriber data server control function platform;

requesting data relating to the MAP request from the data function application on the data function platform;

receiving data relating to the MAP request from the data function application; and returning a response to the MAP request to the serving MSC/VLR.

3. An apparatus for concurrent registration of a multimode mobile station, the apparatus comprising:
a unified subscriber data server control function platform including a RADIUS server process, a RADIUS server platform monitor process, a RADIUS control function application, and a home location register control function application, wherein the unified subscriber data server control function platform maintains class of service information about active protocol registrations and performs concurrent data network registration and voice network registration for multimode subscribers, wherein the unified subscriber data server control function platform is operative to:
  receive an authentication, authorization, and accounting (AAA) query from an external server at the RADIUS server process on the centralized server;
  forward the AAA query to a AAA control function application on a centralized server;
  request data relating to the AAA query from the data function application on the centralized server;
  receive data relating to the AAA query from the data function application;
  return a response to the AAA query to the RADIUS server process;
  forward the response to the AAA query to the external server; and
a unified subscriber data server data function platform including a data function application and a database.

4. The apparatus defined in claim 3, wherein the unified subscriber data server control function platform further includes a RADIUS server management tool.

5. The apparatus defined in claim 3, wherein the RADIUS server process further includes a NavisRADIUS proxy application and is configured to write log files on the unified subscriber data server control function platform.

6. The apparatus defined in claim 3, wherein the database comprises a TimesTen In-Memory Database.

7. The apparatus defined in claim 3, wherein the RADIUS monitor process is configured to heartbeat with the RADIUS server process at regular intervals to check the health of the RADIUS server process.

8. A method of providing concurrent registration of multimode subscribers in a telecommunications network, the method comprising:
maintaining at a centralized server class of service information about active protocol registrations, wherein the centralized server combines data network registration and voice network registration for multimode subscribers; registering a subscriber in a data network via the centralized server by
receiving an authentication, authorization, and accounting (AAA) query from an external server at a RADIUS serve process on the centralized server;
forwarding the AAA query to a AAA control function application on the centralized server;
requesting data relating to the AAA query from a data function application on the centralized server;
receiving data relating to the AAA query from the data function application;
returning a response to the AAA query to the RADIUS server process;
forwarding the response to the AAA query to the external server; and
concurrently registering the subscriber in a voice network via the centralized server.

9. The method defined in claim 8, wherein the step of concurrently registering the subscriber in the voice network further comprises:
receiving a mobile application part (MAP) request from a serving mobile switching center/visiting location register (MSC/VLR) at the centralized server;
forwarding the MAP request to a home location register (HLR) control function application on the centralized server;
requesting data relating to the MAP request from the data function application on the centralized server;
receiving data relating to the MAP request from the data function application;
returning a response to the MAP request to the serving MSC/VLR.

10. The method defined in claim 8, wherein the centralized server further includes a RADIUS server management tool.

11. The method defined in claim 8, wherein the RADIUS server process further includes a NavisRADIUS proxy application and is configured to write log files on the unified subscriber data server control function platform.

12. The method defined in claim 8, wherein the database comprises a TimesTen In-Memory Database.

13. The method defined in claim 8, wherein the RADIUS monitor process is configured to heartbeat with the RADIUS server process at regular intervals to check the health of the RADIUS server process.

* * * * *